United States Patent Office 3,590,088
Patented June 29, 1971

3,590,088
STABILIZATION OF 1,1,1-TRICHLOROETHANE
Hermann Richtzenhain, Cologne-Suelz, and Rudolf Stephan, Ranzel uber Troisdorf, Germany, assignors to Dynamit Nobel Aktiengesellschaft, Patentabteilung, Troisdorf, Bezirk, Cologne, Germany
No Drawing. Application Jan. 16, 1967, Ser. No. 609,681, now Patent No. 3,445,532, dated May 20, 1969, which is a continuation of application Ser. No. 316,772, Oct. 16, 1963. Divided and this application Jan. 5, 1969, Ser. No. 805,923
Claims priority, application Germany, Oct. 18, 1962, D 40,087
Int. Cl. C07c 17/42, 19/02
U.S. Cl. 260—652.5                  1 Claim

ABSTRACT OF THE DISCLOSURE 1,1,1-trichloroethane is stabilized with a mixture comprising β-methoxypropionitrile and 1,4-dioxane.

---

This application is a division of our copending application Ser. No. 609,681, filed Jan. 16, 1967, now Pat. No. 3,445,532, which is in turn a continuation of application Ser. No. 316,772, filed Oct. 16, 1963 and now abandoned.

The present invention relates to new and valuable 1,1,1-trichloroethane stabilizer combinations consisting of an organic compound containing at least one nitrile group and at least one compound of the group consisting of amines, 1,4-dioxane, nitromethane and alcohols, and the invention also includes 1,1,1-trichloroethane incorporating said combinations, said 1,1,1-trichloroethane exhibiting improved stability. More particularly the invention is concerned with the problem of minimizing the marked tendency of 1,1,1-trichloroethane to undergo decomposition and relates to a process for minimizing this tendency.

It is well known that halogen hydrocarbons such as vinyl chloride, vinylidene chloride, trichloroethane, trichloroethylene, perchloroethylene, and other aliphatic chlorinated hydrocarbons very easily undergo decomposition. This decomposition generally takes place with the simultaneous formation of acids and is caused, among other things, by the presence of light, air, or traces of water. It is furthermore known that the splitting off of acid is greatly promoted by the presence of certain metals. Thus, for example, the decomposition reaction is catalyzed by iron, aluminum, magnesium, and the alloys of such metals.

The decomposition reaction can be so violent in the case of some of these compounds, that the further use and processing of these halogen hydrocarbons in metal vessels is possible only with the greatest of difficulty if at all. As noted above, light serves to promote the decomposition further complicating further use and processing of the halogen hydrocarbons.

This defect is especially marked in the case of 1,1,1-trichloroethane, 1,1,1-trichloroethane being more inclined to split off hydrochloric acid and then blacken than any of the above-named chlorinated hydrocarbons. The decomposition reaction can progress to the complete resinification of the material and accordingly the usefulness of 1,1,1-trichloroethane per se is severely limited. For industrial use, 1,1,1-trichloroethane is employed only together with an added stabilizer.

The stabilization of 1,1,1-trichloroethane has heretofore been effected using for the stabilization dialkylsulfoxides, dialkylsulfites, dialkylsulfides, 1,4 - dioxanes, epoxides, monoketones, trialkylsilylethers, tetralkyl compounds of tin and lead, nitroalkanes, sec. or tert. alcohols, nitriles, acetylene alcohols, oxazirines, thiazirines, oxaphosphorines, and thiophosphirines. These known stabilizing agents must usually be used in large quantities in order that there results an adequate stabilizing effect, so that the 1,1,1-trichloroethane thus stabilized takes on the character of a mixture of solvents. The stabilizer-1,1,1-trichloroethane mixtures so characterized are suitable only for a limited field of application. Furthermore the use of dioxane and a number of the other conventionally employed stabilizing compounds is furthermore undesirable from the standpoint of useful applications because of their toxicity. Certain of the conventionally used stabilizers set out above have also proved undesirable due to the color which they impart to the 1,1,1-trichloroethane while others are entirely unsuitable due to their great chemical reactivity with the agents to be treated whereby they are used up in the reaction and the stabilizing effect produced gradually lost, decomposition thereupon setting in. Still another group of the known stabilizers is characterized by the group's great sensitivity to hydrolysis in oxygen and therefore this group finds only limited application.

It is one of the objects of the present invention to provide new and valuable compositions which have proved of value in the stabilization of 1,1,1-trichloroethane.

Another object of the present invention is to provide a simple and effective procedure of stabilizing 1,1,1-trichloroethane.

A further object of the present invention is to provide stabilized 1,1,1-trichloroethane containing such stabilizing compositions and especially 1,1,1-trichloroethane stabilized by a mixture of an organic compound containing at least one nitrile group and at least one compound of the group consisting of amines, 1,4-dioxane, nitromethane, and alcohols.

Other objects of the present invention and advantageous features thereof will become apparent as the invention proceeds.

It has been found that the stabilization of 1,1,1-trichloroethane is obtained by incorporation in the 1,1,1-trichloroethane of a mixture of an organic compound having at least one nitrile with at least one member of the group consisting of amines, 1,4-dioxane, nitromethane, or alcohols. The stabilizing effect is achieved by the addition to the 1,1,1-trichloroethane of a mixture of an organic compound having at least one nitrile group and an amine, 1,4-dioxane, nitromethane, or an alcohol; however, it has been further found that additional improvements in the stabilization effect can be achieved by using as stabilizer a combination of the organic nitrile with two stabilizing agents.

Instances of nitriles suitable as components for the stabilizing mixture include for example: acetonitrile, propionitrile, acrylonitrile, β-methoxypropionitrile, dimethylaminoacetonitrile, methylaminopropionitrile, methyleneaminoacetonitrile, dimethylaminopropionitrile, diethylaminoacetonitrile, methylethylaminoacetonitrile, malodinitrile, and thiodipropionitrile, as well as the mono- and polycyanethylated products of acetone, methylethylketone and acetic acid ester.

The amines which have proven especially effective for use in the stabilizing combinations of the invention are those having more than one amino group in the molecule. While the monoamines have proved to be satisfactory, the effectiveness of the monoamines in the stabilizing mixtures is far exceeded by diamines, as for instance by ethylenediamine and by other polyamines. Examples of amines suitable for use in the stabilizing of 1,1,1-trichloroethane include: triallylamine, di-n-butylamine, dimethylaniline, triethylamine, n-butylamine, ethylenediamine, etc.

As alcohol components for the stabilizing mixture, there may be used the saturated and unsaturated primary, secondary, and tertiary alcohols, preferably having up to 5 carbon atoms per OH group as for example methanol, ethanol, n-propanol, n-butanol, tert. butanol, allyl alcohol, and propargyl alcohol. However, ketone alcohols, such as for example, 4-hydroxybutanone-(2) or 5-hydroxypentanone-(3) and the products of the condensation of $C_1$ to $C_3$ amines with formaldehyde or acetaldehyde can be satisfactorily combined with the nitriles to stabilize methyl chloroform.

The stabilizer compositions of the present invention are employed in quantities of about 0.05 to 10 weight percent but preferably in quantities of 0.2 to 1 weight percent. An addition of 0.5 weight percent of stabilizing composition produces a stabilization of methyl chloroform that is adequate for most practical requirements.

In the preparation of the stabilizing compositions, the amounts of nitrile, alcohol, amine, etc. are generally employed in equivalent amounts. However, it is also possible to prepare the stabilizing mixture with more or less of the nitrile compound being present in relation to the other components, both types of components are, however, required to be present in order to obtain the desired degree of stabilization.

The method of the invention for stabilizing 1,1,1-trichloroethane is especially advantageous in that the above-described stabilizer compositions are considerably more effective than any one of the single components by itself in comparable concentration, as a result of which it is possible to stabilize methyl chloroform with substantially smaller amounts of stabilizer for most general applications.

The effectiveness of any of the stabilizer compositions for a specific purpose can be determined, for example, by simply boiling a specific amount of 1,1,1-trichloroethane with identical percentages of combinations to be evaluated in the presence of a specific amount of a metal powder, granules or chips.

The stabilizer compositions of the present invention can be added in the various stages of the manufacturing process of 1,1,1-trichloroethane. In certain instances the presence of the stabilizing compounds may be especially desirable in the gaseous phase, as for example in the distillation thereof.

The following examples serve to illustrate the present invention without, however, limiting the same thereto.

In the following table, there are given the effect of a number of known stabilizers when used each by themselves and a number of stabilizer combinations in accordance with the invention in the stabilization of 1,1,1-trichloroethane. In each case the stated amount of stabilizer or stabilizer combination and 5 grams of aluminum turnings or 5 grams of aluminum granules was added to 100 grams of 1,1,1-trichloroethane and the resulting mixture then heated under reflux until the chlorohydrocarbon blackened or until HCl was split off. The time that elapsed up to the discoloration point or the evolution of HCl can be taken as a measure of the effectiveness of the tested substance or combination of substances as stabilizer for 1,1,1-trichloroethane.

The examples in the table have been divided in three sections:
(I) Example in which no stabilizer is used.
(II) Examples employing for the stabilization of 1,1,1-trichloroethane the following known stabilizers:
  (a) Amines
  (b) 1,4-dioxane
  (c) Nitromethane
  (d) Alcohols
  (e) Nitriles (III) Examples employing for the stabilization of 1,1,1-trichloroethane the stabilizer combinations in accordance with the invention.

| | Ex. | Stabilizer | Amount added wt. percent | Time for splitting off of HCl or to blackening |
|---|---|---|---|---|
| I | 1 | None | | 1.7 min. |
| II-a | 2 | Triallylamine* | 0.5 | 3 min. |
| | 3 | Di-n-butylamine* | 0.5 | 6 min. |
| | 4 | Dimethylaniline* | 0.5 | 6 min. |
| | 5 | Triethylamine* | 0.5 | 7 min. |
| | 6 | n-Butylamine* | 0.5 | 8 min. |
| | 7 | Ethylene diamine* | 0.5 | 70 min. |
| II-b | 8 | 1,4-dioxane* | 0.5 | 60 min. |
| II-c | 9 | Nitromethane** | 0.5 | 15 hr. |
| II-d | 10 | Ethyl alcohol* | 0.5 | 6 min. |
| | 11 | Allyl alcohol* | 0.5 | 9 min. |
| | 12 | Propargyl alcohol* | 0.5 | 10 min. |
| | 13 | tert. Butanol* | 0.5 | 20 min. |
| II-e | 14 | Acrylonitrile* | 0.5 | 2 hr. |
| | 15 | Acetonitrile* | 0.5 | 2.5 hr. |
| | 16 | β-Methoxypropionitrile* | 0.5 | 100 min. |
| | 17 | Methyleneaminacetonitrile* | 0.5 | 1.25 hr. |
| | 18 | Dicyanethylated methylethylketone.* | 0.5 | 80 min. |
| | 19 | Dicyanethylated acetic acid ester.* | 0.5 | 80 min. |
| III | 20 | Acetonitrile* / Ethylenediamine | 0.25 / 0.25 | 180 min. |
| | 21 | Acetonitrile* / 1,4-dioxane | 0.25 / 0.25 | 173 min. |
| | 22 | β-Methoxypropionitrile** / 1,4-dioxane | 0.25 / 0.25 | 36 hr. |
| | 23 | Acetonitrile* / 1,4-dioxane / Ethylenediamine | 0.17 / 0.17 / 0.17 | 108 min. |
| | 24 | Acetonitrile** / Nitromethane | 0.25 / 0.25 | 22 hr. |
| | 25 | Acetonitrile** / tert. Butanol | 0.25 / 0.25 | 89 hr. |
| | 26 | Acetonitrile** / Nitromethane / tert. Butanol | 0.25 / 0.25 / 0.25 | 92 hr. |
| | 27 | Acetonitrile** / tert. Butanol / Dioxane | 0.25 / 0.25 / 0.25 | 197 hr. |
| | 28 | Acetonitrile** / tert. Butanol / 1,4-dioxane | 1.0 / 5.0 / 0.7 | >144 hr. |
| | 29 | Acetonitrile** / Nitromethane / 1,4-dioxane | 3.0 / 1.0 / 0.8 | >144 hr. |
| | 30 | Acetonitrile** / tert. Butanol / Nitromethane | 0.5 / 3.0 / 0.7 | >144 hr. |

*The stabilization example was conducted in the presence of 5 grams of aluminum turnings.
**The stabilization example was conducted in the presence of 5 grams of aluminum granules.

What is claimed is as follows:

1. A stabilized 1,1,1-trichloroethane composition comprising 1,1,1-trichloroethane and 0.05 to 10 weight percent of a mixture comprising β-methoxypropionitrile and 1,4-dioxane.

References Cited
UNITED STATES PATENTS

| | | | |
|---|---|---|---|
| 3,008,999 | 11/1961 | Kauder | 260—652.5 |
| 3,192,273 | 6/1965 | Bissinger | 260—652.5 |
| 3,265,747 | 8/1966 | Cormany et al. | 260—652.5 |
| 3,251,891 | 5/1966 | Cormany et al. | 260—652.5 |

HOWARD T. MARS, Primary Examiner

U.S. Cl. X.R.
252—153, 171, 403

UNITED STATES PATENT OFFICE
CERTIFICATE OF CORRECTION

Patent No. 3,590,088         Dated June 29, 1971

Inventor(s) Richtzenhain, Herman; and Stephen, Rudolf;

It is certified that error appears in the above-identified patent and that said Letters Patent are hereby corrected as shown below:

Col. 4, line 32 (Spec. p. 8)

"108 min." should be --198 min.--

Col. 4, line 33 (Spec. p. 8)

"22 hr." should be --90 hr.--

Signed and sealed this 5th day of November 1974.

(SEAL)
Attest:

McCOY M. GIBSON JR.                    C. MARSHALL DANN
Attesting Officer                      Commissioner of Patents